United States Patent [19]
McCarthy

[11] 3,710,306
[45] Jan. 9, 1973

[54] SUPPORT FOR AN ELECTRIC CELL

[76] Inventor: Lauris J. McCarthy, 99 North Hermosa, Sierra Madre, Calif. 91204

[22] Filed: Aug. 13, 1971

[21] Appl. No.: 171,522

[52] U.S. Cl.........339/108 R, 339/147 R, 339/278 R, 136/181
[51] Int. Cl. ..............................................H01r 19/46
[58] Field of Search ......136/181, 166, 171; 339/152, 339/108, 147, 278

[56] References Cited

UNITED STATES PATENTS 3,625,774  12/1971  Rodgers ...............................339/152
3,093,515  6/1963  Rector..................................136/166
1,266,814  5/1918  Kammerhoff.....................136/181 X
2,308,270  1/1943  Cubert............................339/152 X

*Primary Examiner*—Richard E. Moore
*Attorney*—Warren H. F. Schmieding

[57] ABSTRACT

The support includes a plate having two openings, each receiving one of the two terminals of an electric cell. The cell is attached to the plate by attaching the terminals to the plate. The plate carries a socket for a multiple contact plug.

A conductor connects one of the terminals with a contact that leads to the socket. Carrying means in the form of a strap is attached to the plate.

5 Claims, 3 Drawing Figures

PATENTED JAN 9 1973

3,710,306

INVENTOR.
LAURIS J. McCARTHY
BY
*Warren H.F. Schmidt*
Attorney

SUPPORT FOR AN ELECTRIC CELL

BACKGROUND OF THE INVENTION

1. Field of the Invention:

The invention is directed to supports for portable electric cells.

2. Description of the Prior Art:

To applicant's knowledge, the prior art does not disclose a support for an electric cell of the type that includes a plate to which the terminals of the cell are fastened, which plate includes a means, such as a strap, for carrying the cell and which plate also carries an electric socket which receives a multiple contact electric plug.

SUMMARY OF THE INVENTION

The cell support includes a plate having openings that are aligned with and receive the protruding terminals of the cell. The cell is secured to the plates by finger-actuated nuts that are screwed onto the threaded terminals. The plate is provided with a third opening, and a metallic tube is aligned with the third opening. The tube is electrically connected with one of the terminals of the cell. A conductor is carried by the plate, one end thereof being connected with the other terminal of the cell and the other end of the conductor forming a contact that is aligned with the tube. The tube and contact form the contacts that are connectable, respectively, with contacts of a multiple contact electric plug.

Other features and the advantages of the present invention will be apparent from the following description, reference being made to the accompanying drawing wherein a preferred embodiment of the invention is illustrated.

DESCRIPTION OF THE PREFERRED EMBODIMENT

Figure 1:
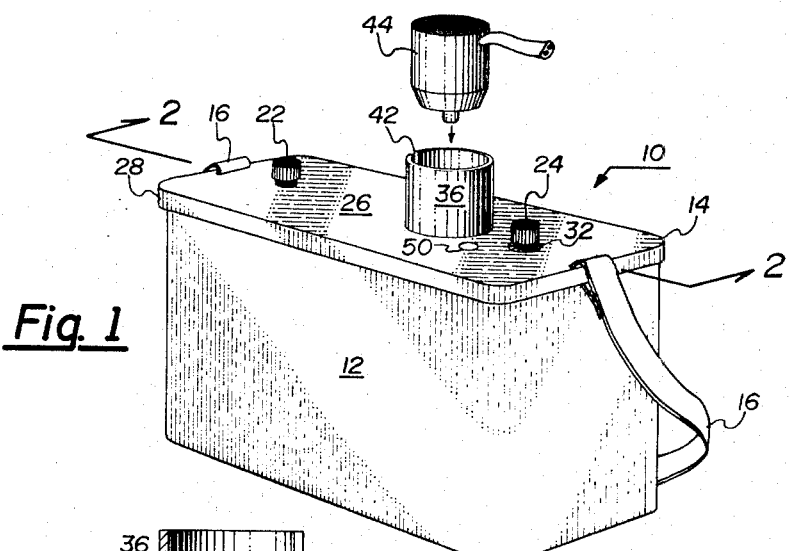
FIG. 1 is a perspective view of the assembly including an electric cell, the support thereof, and a multiple contact electric plug.
Figure 2:
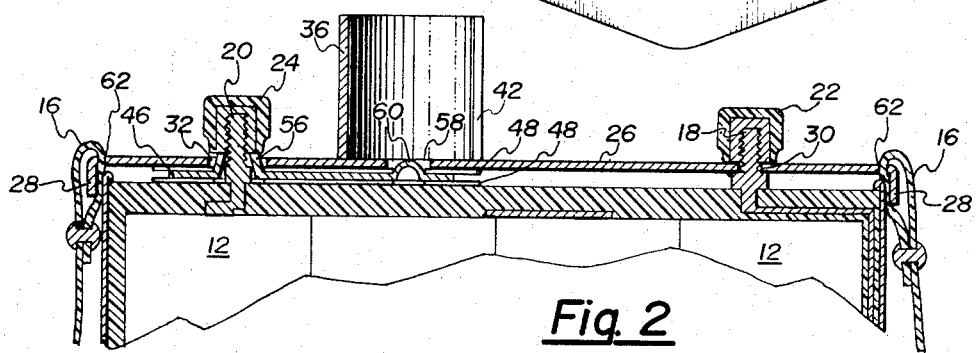
FIG. 2 is a sectional view, on a larger scale, of the support and a fragmentary sectional view of the cell, the section being taken along line 2—2 of FIG. 1.

The assembly 10 includes the cell 12, a support 14 for the cell, and a means for carrying the cell comprising a strap 16. The cell 12 is standard and of the twelve-volt type. It is provided with two terminals 18 and 20 that are spaced from one another. The terminals may be of the threaded-stud type to which finger-actuated nuts 22 and 24 can be attached.

The support 14 for the cell 12 is in the form of a plate having a rectangular top portion 26 and an endless downwardly extending flange 28. The support complements the top of the cell 12.

The top portion 26 of the plate is provided with two openings 30 and 32 that are aligned with and respectively receive the terminals 18 and 20.

Figure 3:
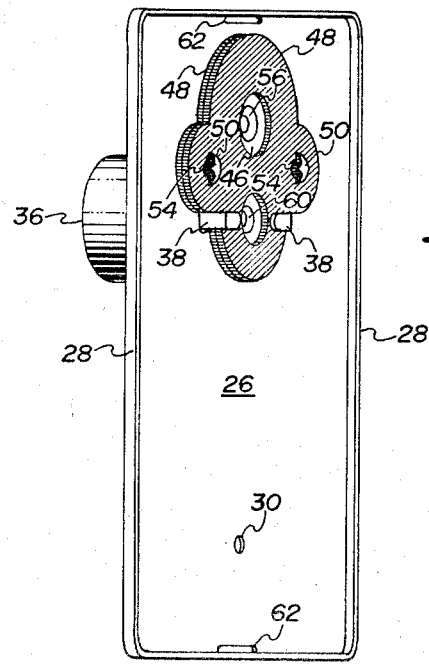
FIG. 3 is a perspective view of the bottom of the support.

The electrical plug receiving socket 36, in the form of a tube, is suitably secured to the top side of the plate 12. The tube is provided with a plurality of downwardly extending extensions 38 which extend through holes 40 in the plate. These extensions are bent toward one another as is more clearly shown in FIG. 3. The tube 36 is split longitudinally as shown at 42 and is biased radially inwardly for yielding, holding a multiple contact plug such as that shown at 44 frictionally within the tube.

An electrical circuit is complete only when a load is connected between terminals 18 and 20. The load is connected by a plug to the terminals of the cell. While forming no part of this invention, such plug includes a peripherally disposed contact and a centrally disposed contact that are insulated from one another, one contact being connectable with one side of the load and the other contact being connectable to the opposite side of the load.

The terminals 18 and 20 must be insulated from one another by the support, yet connectable when a multiple contact plug is inserted in the socket 36. While not limited thereto, the plate is formed of sheet metal; and, therefore, the metal socket 36 is in direct electrical contact with the plate. A conductor 46 is secured to the underside of the plate 12, but is insulated from the plate by insulating strips 48, the strips being disposed on the opposite sides of the conductor. The conductor is held in position under the plate by rivets 50, the insulating strips 48 being provided with aligned holes 54 through which the rivets extend, sufficient clearance being maintained between the rivets and the conductor to prevent contact between the plate and the conductor.

The conductor is provided with a hole 56 that is aligned with the opening 32 in the plate 12. Hole 56 receives the terminal 20. The diameter of the hole 32 is larger than the diameter of terminal 20 so as to assure preventing the terminal from touching the plate. The plate and terminal 20 are fastened also when the nut 24 is tightened against the plate.

An opening 58 is disposed in the plate 12 in axial alignment with the tube forming the socket 36. The conductor 46 is provided with an upwardly bulged portion 60 forming a contact that is axially aligned with the tube.

When the electrical plug 44 is forced inwardly into the socket, the axially disposed contact thereof will engage the contact 60 of the conductor 46 and the peripheral contact of the plug will engage the inside walls of the socket 36. Thus, an electrical circuit can be established between the cell 12 and the load.

The plate is provided with slots 62 for receiving the strap 16 to fasten the strap to the plate.

Thus, it is apparent from the foregoing that by virtue of the present invention, I have provided an assembly comprising an electric cell and a support, to which support an electric plug can be attached and through which support and plug an electric circuit can be energized by the cell. The strap 16 may be in the form of a shoulder strap.

The cell can be readily attached or removed requiring no extraneous tool for these purposes.

Having described my invention, I claim:

1. A support for a portable electric cell, which cell includes two fixed, protruding terminals, said terminals being spaced from one another, said support comprising:

(A) a plate having:

1. openings aligned with the terminals for receiving the terminals,
2. a third opening;

B. means for fastening one of the terminals that is received in one of the two openings to the plate;

C. a metallic socket for receiving a multiple contact plug, said socket having an opening aligned with the third mentioned opening, said socket forming a contact engageable with one of the contacts of the plug;

D. means for fastening the socket to the plate;

E. a conductor having:
1. an opening aligned with the opening in the other opening for the other of said two terminal openings, the other of said terminals extending through said opening in the conductor,
2. said conductor having a contact portion aligned with the third mentioned openings;

F. means for fastening said other terminal to the plate;

G. carrying means attached to the plate.

2. A support for a portable electric cell as defined in claim 1, characterized in that the third mentioned opening is disposed intermediate the openings for the terminals.

3. A support for a portable electric cell, which cell includes two fixed, protruding terminals, said terminals being spaced from one another, said support comprising in combination:

A. a metal plate having:
1. openings aligned with the terminals for receiving the same,
2. a third opening;

B. means for fastening one of the terminals in current conducting relationship with the metal plate;

C. a metal socket for receiving a multiple contact plug, said socket having an opening aligned with the third mentioned opening in the plate;

D. means for fixing the metal socket in grounded relationship with the metal plate;

E. a conductor having:
1. an opening aligned with the opening for the other of said terminals,
2. a contactable portion aligned with the third mentioned opening in the plate;

F. means for insulating the conductor from the plate;

G. means for fastening the said other terminal to the plate;

H. carrying means attached to the plate.

4. A support for a portable electric cell as defined in claim 3, characterized in that the third mentioned opening is disposed intermediate the openings for the terminals.

5. A support for a portable electric cell as defined in claim 3, characterized in that the insulating means comprises two sheets of insulating material, the conductor being disposed between said sheets; and further characterized to include:

I. means for fixing the insulating sheets to the plate.

* * * * *